United States Patent [19]
Robinson

[11] Patent Number: 4,964,344
[45] Date of Patent: Oct. 23, 1990

[54] SIDE LINK PUSHER DOG WITH LUBRICATION PASSAGE

[75] Inventor: Victor G. Robinson, Irvine, Calif.

[73] Assignee: Mid-West Conveyor Company, Inc., Kansas City, Kans.

[21] Appl. No.: 345,198

[22] Filed: Apr. 28, 1989

[51] Int. Cl.$^5$ ............................................. B61B 12/08
[52] U.S. Cl. .................................. 104/172.5; 184/15.3
[58] Field of Search ............... 104/172.1, 172.2, 172.5, 104/172.3; 198/500, 730, 728, 850, 851, 852; 474/91; 305/14; 184/15.1, 15.2, 15.3

[56] References Cited

U.S. PATENT DOCUMENTS

| | | | |
|---|---|---|---|
| 3,377,962 | 4/1968 | Dehne | 104/172.4 |
| 3,437,054 | 4/1969 | Bishop | 104/178 |
| 3,451,352 | 6/1969 | Curry et al. | 104/172.4 |
| 3,477,390 | 11/1969 | Dolding | 104/172.4 |
| 3,503,337 | 3/1970 | Haase | 104/172.4 |
| 3,774,546 | 11/1973 | Krammer | 104/172.4 |
| 3,860,457 | 1/1975 | Vourinen et al. | 148/15 |
| 4,014,267 | 3/1977 | Fitch | 104/172.5 |
| 4,064,970 | 12/1977 | Reeves | 184/15.3 |
| 4,542,698 | 9/1985 | Wakabayashi | 104/172.3 |
| 4,790,247 | 12/1988 | Summa | 104/172.2 |

FOREIGN PATENT DOCUMENTS
2132502 1/1973 Fed. Rep. of Germany.

Primary Examiner—Robert P. Olszewski
Assistant Examiner—Mark T. Le
Attorney, Agent, or Firm—Litman, McMahon & Brown

[57] ABSTRACT

A side link pusher dog member includes an elongated side link bar with an integral pusher dog extending upward from an upper surface at a leading end and an integral chain pin extending downward from a lower surface thereof. A trailing end has a slot intersected by a transverse recess to receive and position a conventional chain pin. The integral chain pin and rear chain pin have cylindrical portions forming bearing surfaces with a leading and trailing center link respectively and have T-shaped lower ends to receive a conventional side link member to form a complete side link pusher dog assembly. A lubrication passage is formed through the side link bar at a position immediately behind the pusher dog to provide access for a lubricant from a chain pin oiler machine to lubricate the pivot joint formed by the integral chain pin and the leading center link. The rear pivot joint is lubricated by the oiler machine through the slot in the trailing end of the side link bar.

18 Claims, 1 Drawing Sheet

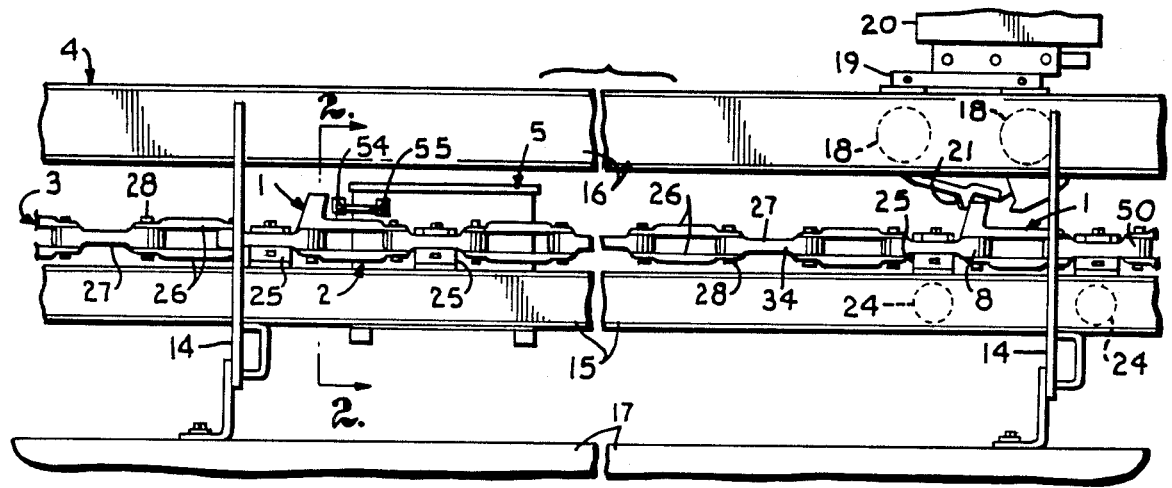
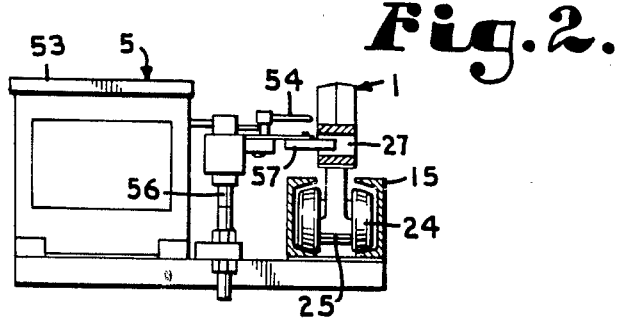
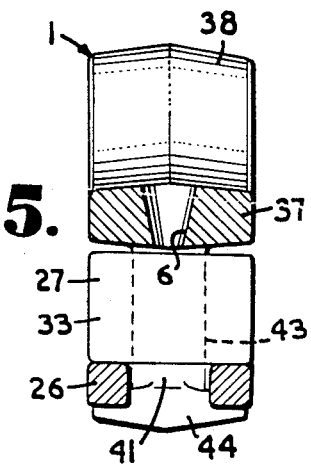
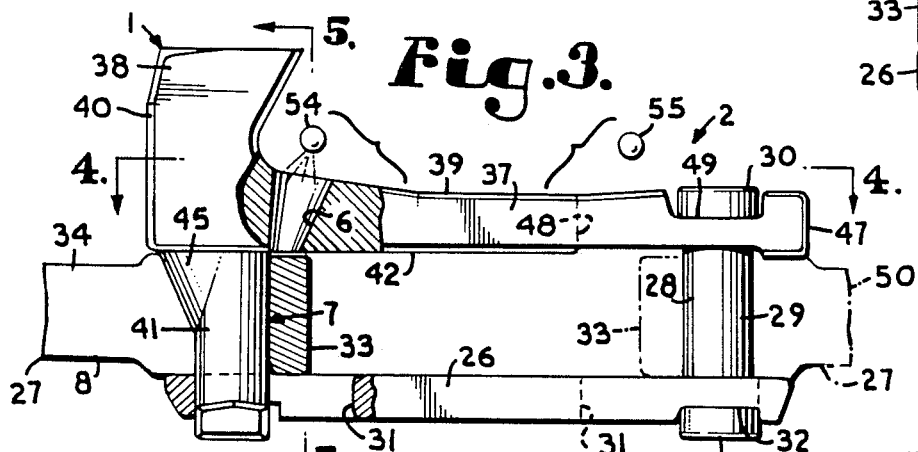
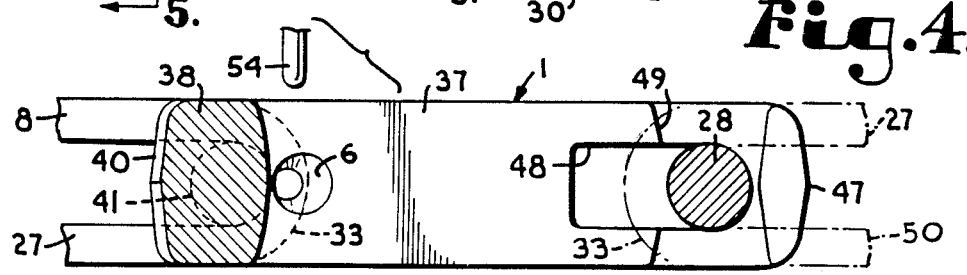

4,964,344

SIDE LINK PUSHER DOG WITH LUBRICATION PASSAGE

FIELD OF THE INVENTION

The present invention relates to inverted power and free conveyors and, more particularly, to a side link pusher dog with a lubrication passage for such a conveyor.

BACKGROUND OF THE INVENTION

In typical power and free conveyors, a load carrier is mounted on a load trolley or trolleys which run on a load track. The load carrier is moved by a continuously running power or drive chain by engagement between a drive or pusher dog on the drive chain and a retractable trolley dog on the load carrier or trolley. The drive chain is supported by power trolleys running along a power track. In overhead power and free conveyors, a load supported by the load carrier is suspended below the tracks supporting the load trolleys and the drive chain. The pusher dog extends downward to engage an upwardly extending trolley dog. The trolley dog may be retracted from the pusher dog to allow the load to coast on a downhill section of the load track, to halt the load for operations thereon, or the like. On many power and free conveyors, the load trolleys incorporate accumulation mechanisms which cause drive disengagement of carriers approaching behind a halted carrier to prevent collisions between the carriers and loads.

Inverted power and free conveyors are similar to overhead power and free conveyors except that, as their name suggests, they are turned upside down. On inverted power and free conveyors, a power track supporting the power trolleys carrying the drive chain is at the lowest level. Above the power track is the load track supporting the load trolleys, with the load carrier above the load track. The pusher dogs of inverted power and free conveyors extend upward to engage downwardly extending trolley dogs which may be retracted to disengage drive from the load for the same reasons as for overhead track conveyors. Both overhead and inverted power and free conveyors find application in factories, such as on automotive assembly lines to carry automotive bodies as manufacturing operations are performed.

Drive chains for both types of power and free conveyors are similar and many types are formed by alternating center links and pairs of side links. In a typical drive chain, each center link is a vertically open endless loop with straight sides and cylindrical or semi-annular ends. The side links are elongated members or bars which are horizontally flattened. The opposite ends of an upper and a lower side link of each pair overlap the adjacent center links and are connected to the center links by cylindrical chain pins. The chain pins have T-shaped heads at opposite ends which engage recesses on the outer surfaces of the side links. The sides of the center links are "waisted" or dumbbell shaped and the side links have longitudinal slots in their ends to allow the drive chain to be assembled without tools. The center links pivot about the chain pins or the side links while chain pins pivot about the center links for the drive chain to pass about a curve having a vertical axis.

The drive chain is supported by the power track on power trolleys which are usually attached to center links at selected spacings. On overhead conveyors the power trolleys extend above the drive chain while on inverted conveyors, the power trolleys extend below the drive chain. The drive chain is usually driven by a large diameter drive wheel having gear teeth or sprockets which mesh between the side links to engage a trailing end of a center link. For this reason, attachments to such drive chains are usually made to the center links to avoid interference with the drive gear teeth.

Pusher dogs for such chains are usually in the form of side link pusher dogs which replace one of the side links of a pair. A side link pusher dog for an overhead conveyor has an integral dog or projection extending downwardly from a side link bar to engage an upwardly extending trolley dog. Conversely, a side link pusher dog for an inverted conveyor extends upward. Typically, side link pusher dogs have an integral chain pin extending from the side link bar on the opposite side from the dog projection. Thus, a side link pusher dog connects with a leading center link by the integral chain pin and with a trailing center link by a conventional chain pin. A conventional side link is then connected with the opposite ends of the integral chain pin and the conventional chain pin to complete the modified section of the chain.

In order to reduce frictional wear of the components of the drive chain and to prevent binding therebetween which might result in breakage, the frictionally engaging surfaces must be lubricated. This is usually accomplished by an automatic chain pin oiler machine which might also be adapted to lubricate power trolley wheel bearings. The oiler machine detects the presence of a center link and directs a shot of lubricant toward the bearing surfaces of the ends of the center link and the chain pins. The shot of lubricant is usually directed toward the slots in the upper side links on each side of the center link, and gravity and flexure of the pivotal joint disperses the lubricant over the bearing surfaces.

On a drive chain for an overhead power and free conveyor drive chain, a side link pusher dog is located on the lower side of a side link pair with a conventional slotted side link on the upper side of the pair. Thus, a conventional oiler machine can be used to lubricate such a chain since the pivot joints are accessible to the oiler nozzles through the slots on the upper side link. However, a problem arises in lubricating drive chains for inverted power and free conveyors, because the side link pusher dog is located on the upper side of a side link pair. While the trailing end of the side link pusher dog is slotted, the dog projection occupies the position at the leading end of the side link bar where a chain pin slot of an ordinary side link would be. Thus, there is no access for lubricating the leading pivot joint of a side link pusher dog for an inverted power and free conveyor drive chain using a conventionally configured chain pin oiler machine.

SUMMARY OF THE INVENTION

The present invention provides an improved side link pusher dog which is adapted particularly for use on an inverted power and free conveyor with a conventional chain pin oiler machine. A side link pusher dog member according to the present invention comprises an elongated side link bar with an integral pusher dog extending from an upper surface and an integral chain pin extending from a lower surface at a front or leading end of the side link bar. A rear or trailing end of the side link bar has a longitudinally oriented slot formed therethrough which is intersected by a transverse recess in the upper side to receive a conventional chain pin. A leading center link is connected to the integral chain pin, and a trailing center link is connected to the conventional chain pin. The integral chain pin has a T-shaped head at a lower end to receive a lower side link member of conventional tupe between it and the rear chain pin.

The frictionally engaging surfaces of the trailing center link and chain pin may be lubricated by a conventional chain pin oiler machine by a spray of lubricant through the slot at the rear end of the side link bar. In order to allow the frictionally engaging surfaces of the leading center link and the integral chain pin to be lubricated by a conventional chain pin oiler, the side link bar is provided with a lubrication passage immediately behind the pusher dog. The lubrication passage exposes an upper surface of the rear end of the leading center link to the lubricant spray from the oiler machine, and the lubricant is dispersed to the bearing surfaces of the leading center link and integral chain pin by gravity and by flexure of the joint formed by these components.

In a preferred embodiment of the present invention, the side link pusher dog member is formed by casting ductile iron which is heat treated by an austempering process. This results in the necessary toughness to withstand shock and shear loads to which the pusher dog and integral chain pin are subjected when engaging heavy standing loads and in necessary surface hardness to avoid wear of the bearing surfaces. Additionally, manufacture of the side link pusher member by casting and heat treating is more economical than forging and machining.

OBJECTS OF THE INVENTION

The principal objects of the present invention are: to provide an improved component for inverted power and free conveyors; to provide such an improved component for use with a power and free conveyor chain formed of alternating sets of center links and pairs of side links connected by chain connection pins having integral T-shaped heads on their ends; to provide, particularly, an improved side link pusher dog member for such a conveyor; to provide such a pusher dog member which is compatible with existing chain components and chain lubricating equipment of such conveyors; to provide such a pusher dog member including an integral pusher dog and chain connection on opposite sides of a leading end of a side link type bar; to provide such a pusher dog member with a means of lubricating surfaces engaging the integral chain connection pin; to provide such a pusher dog member with a lubrication passage to receive a lubricant from a conventional chain lubricating machine and direct the lubricant to surfaces of a center link engaging the integral chain connection pin; to provide such a pusher dog member including a slot and intersecting recess at a trailing end to receive and position a conventional chain connection pin for connection of a trailing center link to the pusher dog member; to provide such a pusher dog member wherein the integral chain connection pin includes a T-shaped head at a lower end for connection of a conventional side link bar between it and the trailing chain connection pin; to provide such a pusher dog member which is formed by casting and, particularly, which is formed of cast, austempered ductile iron; and to provide such a side link pusher dog member with a lubricating passage which is economical to manufacture, convenient to install and durable in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary side elevational view of an inverted power and free conveyor incorporating a side link pusher dog member with a lubrication passage which embodies the present invention.

FIG. 2 is a somewhat enlarged fragmentary transverse 8 sectional view taken along line 2—2 of FIG. 1 and illustrates cooperation between a chain lubrication machine and the side link pusher member.

FIG. 3 is a greatly enlarged side elevational view of a side link pusher assembly according to the present invention with portions broken away to illustrate the lubrication passage thereof.

FIG. 4 is a top longitudinal sectional view taken on line 4—4 of FIG. 3 and illustrates further details of the lubrication passage.

FIG. 5 is a transverse sectional view taken on line 5—5 of FIG. 3 and illustrates the lubrication passage from another point of view.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a side link pusher dog member with a lubrication passage embodying the present invention. The member 1 forms part of a side link pusher dog assembly 2 of a power or drive chain 3 of an inverted power and free conveyor system 4. The conveyor system 4 includes a conventional chain pin oiler machine 5 which periodically sprays lubricant on the components of the chain 3 to facilitate flexure of the chain. In particular, the side link pusher dog member 1 of the present invention is provided with a lubricant passage 6 to allow lubrication, by the oiler machine 5, of a bearing joint 7 formed by portions of the member 1 and a leading center link 8 connected thereto.

The illustrated conveyor 4 system is a conventional inverted power and free conveyor and includes standards 14 supporting a power or drive track 15 and a load track 16 above a support surface 17. The load track 16 is formed by a pair of inwardly turned channels which support wheels 18 of a load trolley 19. The load trolley 19 is adapted for attachment of a load carrier 20 thereto ±o support a load to be conveyed by the conveyor system 4, such as an automobile chassis in an automotive assembly plant. For conveying relatively long loads, a load carrier 20 may be supported by a pair of load trolleys 19. The load trolley 19 includes a depending load trolley dog 21 which may be retracted to prevent movement of the load trolley, as at a station where manufacturing operations are to be performed, or extended for engagement by the conveyor chain 3.

The power track 15 is similar to the load track 16 and is illustrated as being formed by a pair of mutually inwardly turned channels which support wheels 24 of a power trolley 25. The conveyor chain 3 is formed by alternating sets of side links 26 and center links 27 pivotally connected by chain pins 28. Each chain pin 28 includes a cylindrical shaft 29 (FIG. 3) with T-shaped heads 30 at opposite ends. The side links 26 are elongated, flattened bars with longitudinal slots 31 at opposite ends to receive the chain pins 28 and transverse recesses 32 intersecting the slots to position the heads 30. The center links 27 are vertically open elongated loops with annular ends 33 which frictionally engage the shafts 29 of the chain pins 28. The illustrated center links 27 are somewhat dumbbell shaped as viewed from the side with reduced center portions 34 of the sides.

The chain 3 is assembled, without tools, by placing upper and lower side links 26 in the center portion 34 of a center link 27, inserting chain pins 28 through the slots in the side links, rotating the heads 30 of the pins to align with the recesses 32 of the side links, and finally sliding the side links to the end 33 of a center link. The load trolley 19 is conveyed by engagement of a dog on the moving conveyor chain 3 with the load trolley dog 21. The chain 3 is propelled by sprockets or teeth of a drive gear (not shown) which engage ends 33 of the center links 27 in the space between a pair of side links 26. The side link pusher member 1 of the present invention is similar in many respects to conventional side link pusher dogs.

Referring to FIGS. 3 and 4, the illustrated dog member 1 includes an elongated and flattened side link bar portion 37 with an integral pusher dog 38 extending upward from an upper surface 39 at a front or leading end 40 of the side link bar 37. An integral chain pin 41 extends from a lower surface 42 of the bar 37 below the pusher dog 38. The chain pin 41 includes a cylindrical shaft 43 and a transverse T-shaped head 44 at a lower end thereof. An inner surface of the rear end 33 of the leading center link 8 engages the cylindrical shaft 43 of the integral chain pin 41. The front side of the illustrated chain pin 41 is reinforced at 45 where it joins the side link bar 37 to increase the shear strength of the joint. The joint plane between the pin 41 and the bar 37 must be able to withstand an abrupt shear load when the pusher dog 38 engages a load trolley dog 21 of a stationary load trolley 19, which may support in excess of a ton.

A rear or trailing end 47 of the side link bar 37 has a longitudinal slot 48 formed therethrough with a transverse recess 49 formed in the upper surface 39 and intersecting the slot 48. The slot 48 and recess 49 are provided to receive and position a chain pin 28 to connect a trailing center link 50 and a lower side link member 26 extending between the lower ends of the integral chain pin 41 and the chain pin 28 to thereby connect the pusher dog member 1 in the chain 3. The leading and trailing center links 8 and 50 are both provided with power trolleys 25 to prevent the pusher dog member 1 from dipping below the load trolley dog 21 in reaction to engaging same.

The illustrated chain pin oiler machine 5 is a conventional type of device for lubricating conveyor chains and includes a pump and control assembly 53 which directs a lubricant to a pair of oil spray nozzles 54 and 55. The nozzles are mounted on an upstanding support member 56 which also supports a chain position sensor or trigger wheel 57. The wheel 57 is pivotally mounted with respect to the support 56 and rides along the sides of the center links 27. The wheel 57 cooperates with the pump and control assembly 53 in such a manner that whenever the wheel 57 rides into the space between a pair of side links 26, the assembly 53 causes a spray of lubricant to issue from the nozzles 54 and 55. The wheel 57 may be positioned one chain pitch ahead of the set of nozzles 54 and 55.

The nozzles 54 and 55 are positioned and oriented to direct a metered shot or spray of lubricant through the slots 31 of an upper side link 26 which are positioned below the nozzles 54 and 55 toward the pivot joints formed by the ends 33 of the leading and trailing center links 27 and the chain pins 28. Flexure of the chain pivot joints and, to some extent, gravity cause the distribution of the lubricant along the frictionally engaging surfaces of the chain pins and ends 33 of the center links 27. The oiler machine 5 may also include additional nozzles (not shown) for lubricating the trolley wheels 25.

The side link pusher dog assembly 2, if inverted from the orientation illustrated in FIG. 3, may be used on an overhead power and free conveyor (not shown) and does not require the lubrication passage 6. The slots 31 in such an arrangement are located on an upper side link member 26 and thereby provide access to the ends 33 of the center links 27 for cooperation with the chain pin oiler 5. However, on the inverted power and free conveyor 4, as illustrated, the pusher dog 38 interferes with the spray of lubricant onto the rear end 33 of the leading center link 8. The side link pusher dog member 1 of the present invention overcomes this interference by providing the lubrication passage 6 in a position to provide access to the trailing end 33 of the leading center link 8. The illustrated lubrication passage 6 is frustoconical in shape to funnel the lubricant to an inner area of a top surface of the rear end of the center link 8. Alternatively, other shapes may be employed for the lubrication passage 6. The passage 6 is positioned in trailing relating to the pusher dog 38 to align with the forward oil nozzle 54 of the chain pin oiler 5. The slot 48 at the trailing end 47 of the side link bar 37 is positioned similar to the rear slot 31 of a conventional side link member 26 and aligns with the rear nozzle 55 to provide access to the lubricant therefrom.

The side link pusher dog member 1 may be manufactured by any appropriate process or processes, such as forging, punching, and machining. In a preferred embodiment of the present invention, the member 1 is formed of cast ductile iron which is austempered. Austempering of ductile iron is well known in the metal forming arts and exemplary details regarding this process may be obtained by reference to U.S. Pat. No. 3,860,457 which issued to Vourinen et al. on Jan. 14, 1975 and which is incorporated herein by reference. The side link pusher dog member 1 which is formed by these processes has the necessary strength to withstand normal tensile loads, the toughess to withstand shock loads when the dog 38 engages a stationary load and when the pusher dogs 38 of other members 1 in the chain 3 engage loads, and the surface hardness, particularly of the integral chain pin 41, to avoid bearing wear.

It is to be understood that while certain forms of the present invention have been illustrated and described herein, it is not to be limited to the specific forms or arrangement of parts described and shown.

What is claimed is:

1. A side link member for use with a drive chain of a power and free conveyor, said chain being formed of alternating center links and pairs of side links, said side link member comprising:
   (a) an elongated side link bar having opposite ends and opposite upper and lower surfaces;
   (b) an integral chain connection pin extending from said lower surface of a first end of said side link bar, said pin adapted for connection of a first center link to said side link bar;
   (c) connection means on a second end of said side link bar for connection of a second center link to said side link bar; and
   (d) a lubrication passage formed through said side link bar and positioned in spaced relation to said first end with said pin positioned between said first end and said passage, said passage located to direct lubricant surfaces frictionally engaging said pin.

2. A side link member as set forth in claim 1 wherein:
   (a) said side link member has an integral pusher dog extending from said upper surface and positioned at said first end of said side link bar; and
   (a) said lubrication passage is positioned adjacent said pusher dog and toward said second end of said side link bar.

3. A side link pusher dog member for use with a drive chain of a power and free conveyor, said chain being formed of alternating center links and pairs of side links, said pusher dog member comprising:
   (a) an elongated side link bar having a leading end and an opposite trailing end and opposite flattened surfaces;
   (b) a pusher dog extending from one of said surfaces at said leading end of said side link bar;
   (c) a chain connection pin extending from said side link bar at said leading end on an opposite surface from said pusher dog, said pin adapted for connection of a first center link to said side link bar;
   (d) center link connection means on a trailing end of said side link bar for connection of a second center link to said side link bar; and
   (e) a lubrication passage formed through said side link bar and positioned in trailing relation to said pusher dog to direct a lubricant from a chain lubricating machine above said side link bar to surfaces frictionally engaging said pin.

4. A pusher dog member as set forth in claim 3 wherein said conveyor is an inverted power and free conveyor and wherein:
   (a) said pusher dog extends from an upper surface of said side link bar; and
   (b) said connection pin extends from a lower surface of said side link bar.

5. A pusher dog member as set forth in claim 3 wherein said center link connection means includes:
   (a) a second chain connection pin connected to said side link bar at said trailing end, said second pin being adapted for connection of said second center link to said side link bar.

6. A pusher dog member as set forth in claim 3 wherein said center link connection means includes:
   (a) a slot formed through said side link bar at said trailing end;
   (b) a recess formed in said first surface of said side link bar at said trailing end and intersecting said slot; and
   (c) said slot and recess being adapted to receive a chain connection pin having a side link connection head through said slot and position said head in said recess for connection of said second center link to said side link bar.

7. A pusher dog member as set forth in claim 3 wherein said chain connection pin includes:
   (a) side link connection means at an outer end of said pin and adapted for connection of a second side link bar between said side link connection means and said center link connection means.

8. A pusher dog member as set forth in claim 3 wherein said chain connection pin is a first chain connection pin and wherein:
   (a) said center link connection means includes a slot at said trailing end of said side link bar which is intersected by a recess in said first surface of said side link bar;
   (b) a second chain connection pin with a side link connection head at opposite ends thereof has a first head received through said slot and positioned in said recess;
   (c) said first chain connection pin has a side link connection head at an outer end thereof;
   (d) said second center link engages said second chain connection pin; and
   (e) a second side link bar is engaged between said said first pin and a second head of said second pin.

9. A pusher dog member as set forth in claim 3 wherein:
   (a) said pusher dog member is formed by casting.

10. A pusher dog member as set forth in claim 3 wherein:
    (a) said pusher dog member is formed of cast austempered ductile iron.

11. A side link pusher dog member for use with a drive chain of an inverted power and free conveyor, said chain being formed of alternating center links and pairs of side links, said pusher dog member comprising:
    (a) an elongated side link bar having a leading end and a trailing end and opposite upper and lower surfaces;
    (b) an integral pusher dog extending upward from said upper surface of said side link bar at said leading end;
    (c) an integral chain connection pin extending downward from said lower surface of said side link bar at said leading end, said pin adapted for connection of a leading center link to said side link bar;
    (d) trailing center link connection means on said trailing end of said side link bar for connection of a trailing center link to said side link bar; and
    (e) a lubrication passage formed through said side link bar and positioned in trailing relation to said pusher dog to direct a lubricant from a chain lubricating machine above said side link bar to surfaces frictionally engaging said pin.

12. A pusher dog member as set forth in claim 11 wherein said trailing center link connection means includes:
    (a) a trailing chain connection pin connected to said side link bar at said trailing end, said trailing pin being adapted for connection of said trailing center link to said side link bar.

13. A pusher dog member as set forth in claim 11 wherein said trailing center link connection means includes:
(a) a slot formed through said side link bar at said trailing end;
(b) a recess formed in said first surface of said side link bar at said trailing end and intersecting said slot; and
(c) said slot and recess being adapted to receive a trailing chain connection pin having a side link connection head through said slot and position said head in said recess for connection of said trailing center link to said side link bar.

14. A pusher dog member as set forth in claim 11 wherein said chain connection pin includes:
(a) side link connection means at a lower end and adapted for connection of a lower side link bar between said side link connection means and said trailing center link connection means.

15. A pusher dog member as set forth in claim 11 wherein said chain connection pin is a leading chain connection pin and wherein:
(a) said center link connection means includes a slot at said trailing end of said side link bar which is intersected by a recess in said upper surface of said side link bar;
(b) a trailing chain connection pin with a side link connection head at opposite ends thereof has an upper head received through said slot end positioned in said recess;
(c) said leading chain connection pin has a side link connection head at a lower end thereof
(d) said trailing center link engages said trailing chain connection pin; and
(e) a lower side link bar is engaged between said said leading chain connection pin and a lower head of said trailing chain connection pin.

16. A pusher dog member as set forth in claim 11 wherein:
(a) said pusher dog member is formed by casting.

17. A pusher dog member as set forth in claim 11 wherein:
(a) said pusher dog member is formed of cast austempered ductile iron.

18. An inverted power and free conveyor comprising:
(a) means supporting and driving a conveyor drive chain formed of alternating sets of center links connected at opposite ends with pairs of upper and lower side links by chain connection pins received through openings in said side links;
(b) chain lubricating means positioned to communicate a chain lubricant toward surfaces engaging said chain connection pins through said openings in the upper side links;
(c) a plurality of side link pusher dog members replacing said upper side links at selected spacings along said chain, each side link pusher dog member including an integral pusher dog extending upward from a leading end of a side link bar portion and an integral chain connection pin extending downward from said leading end of said side link bar portion, said pusher dog and said side link bar blocking lubricant access to said integral pin; and
(d) a lubrication passage formed through said side link bar portion of each pusher dog member and positioned in trailing relation to said integral pusher dog to direct said lubricant from said chain lubricating means above said side link bar to surfaces frictionally engaging said integral chain connection pin.

* * * * *